Dec. 23, 1952           C. WILDE           2,623,186

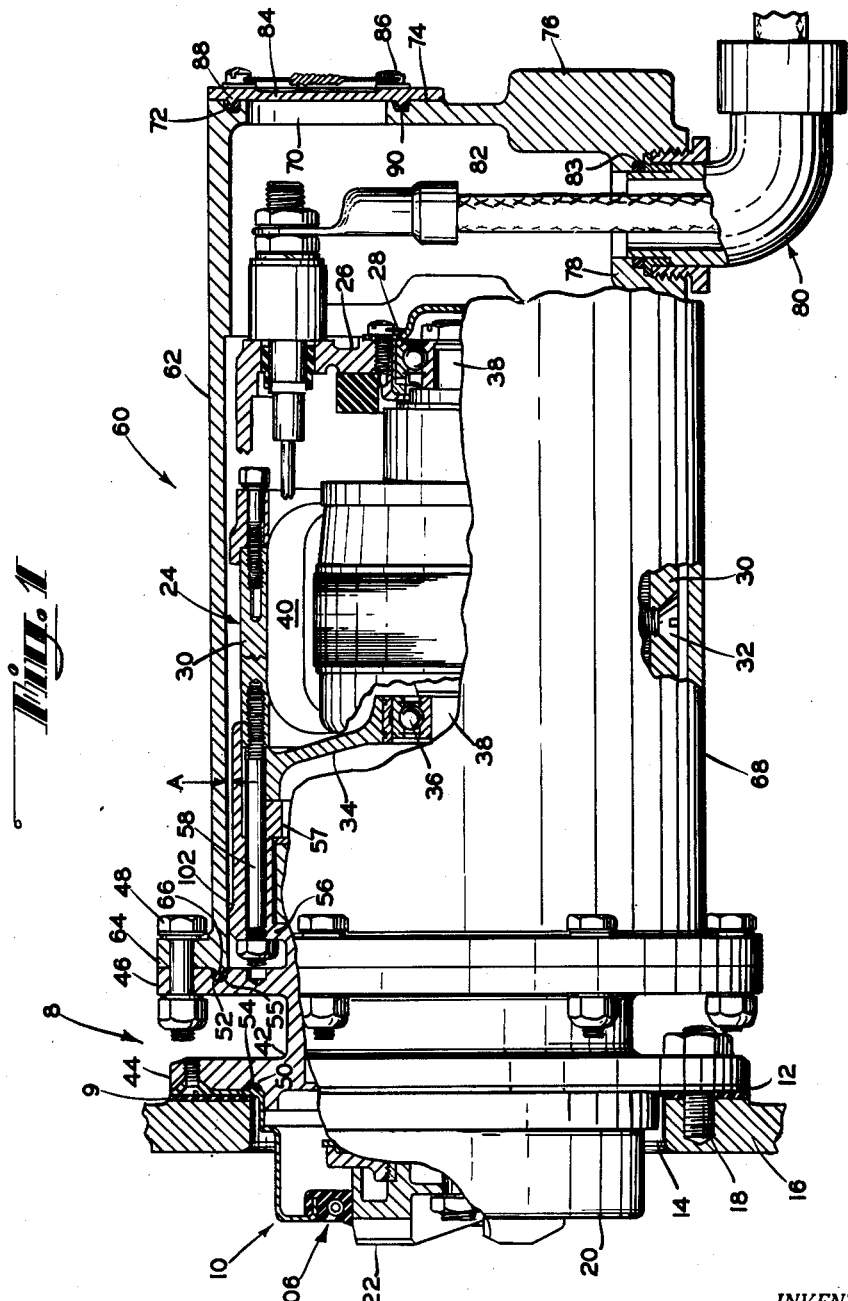

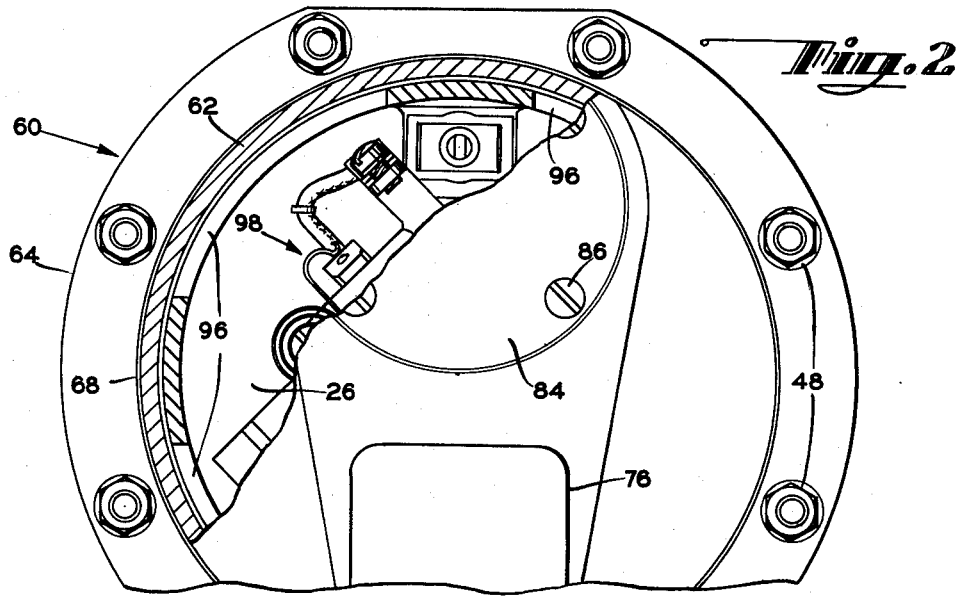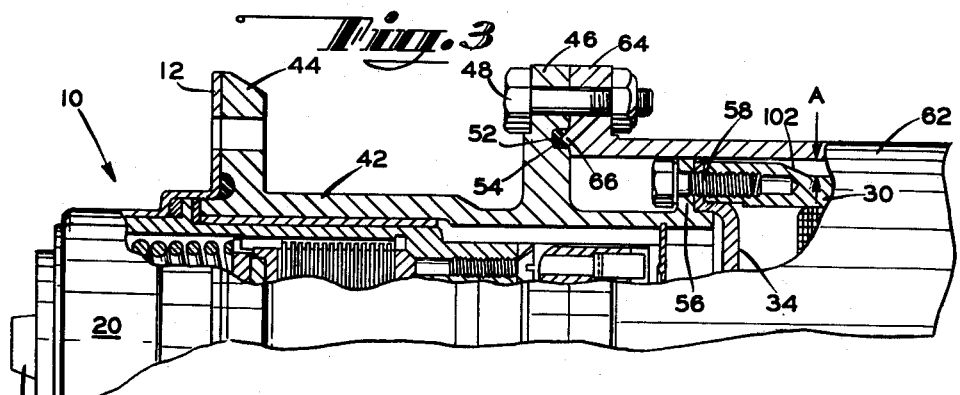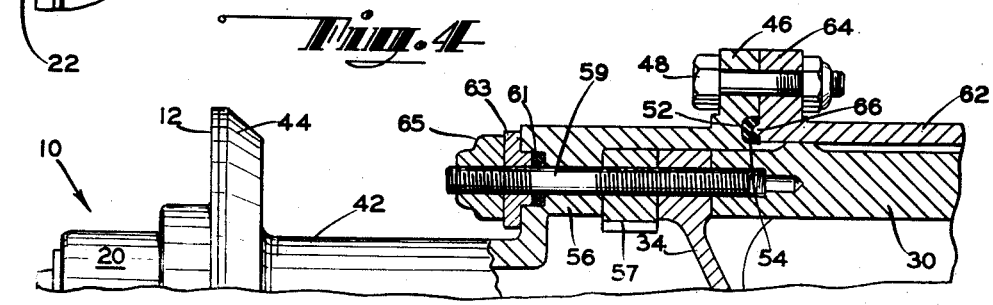

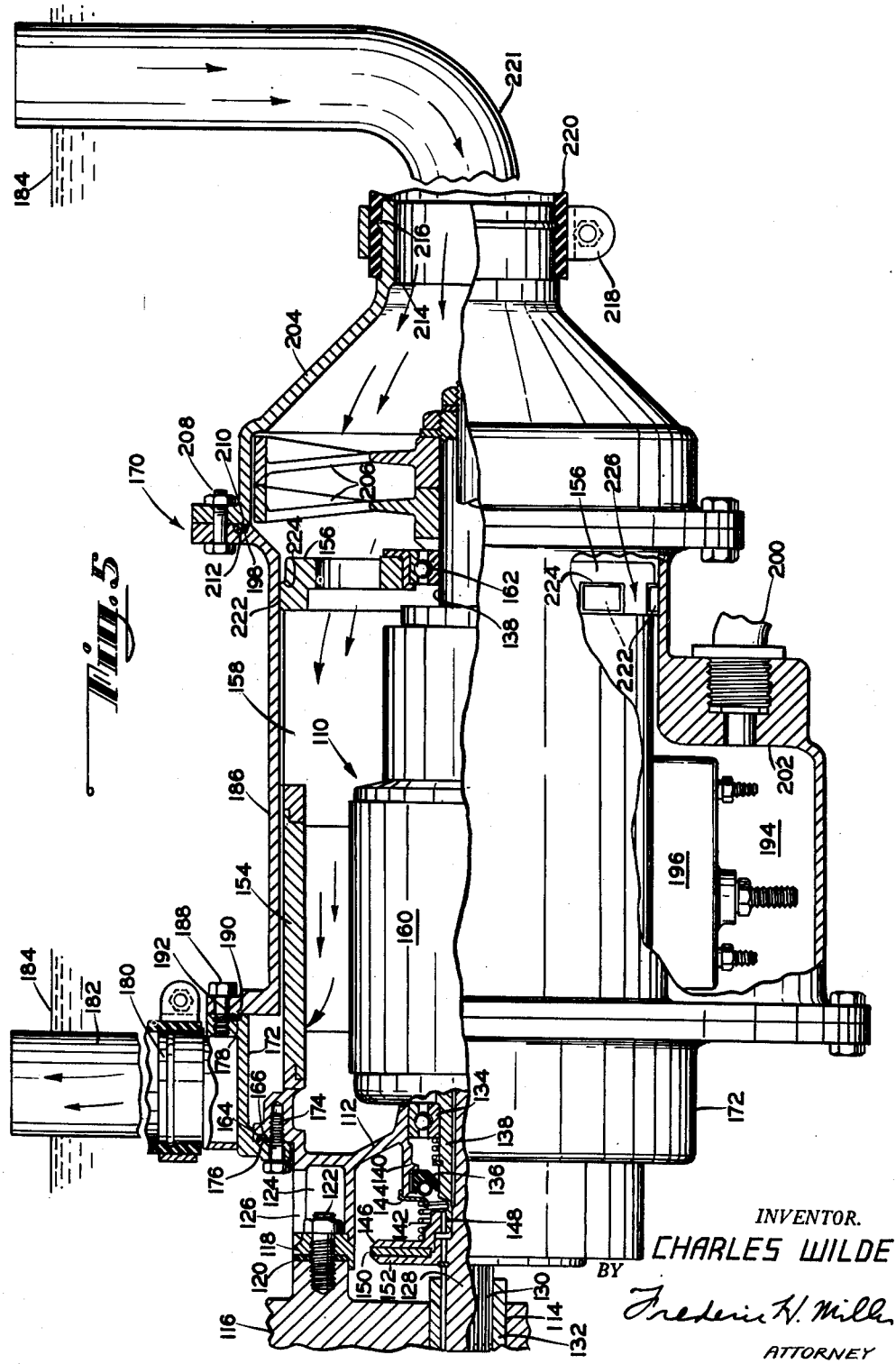

ENGINE ACCESSORY FOR UNDERWATER OPERATION

Filed March 23, 1948           5 Sheets-Sheet 4

INVENTOR.
CHARLES WILDE
BY
Frederic H. Miller
ATTORNEY

Dec. 23, 1952 — C. WILDE — 2,623,186
ENGINE ACCESSORY FOR UNDERWATER OPERATION
Filed March 23, 1948 — 5 Sheets-Sheet 5

INVENTOR.
CHARLES WILDE
BY Frederic H. Miller
ATTORNEY

Patented Dec. 23, 1952

2,623,186

UNITED STATES PATENT OFFICE 2,623,186

ENGINE ACCESSORY FOR UNDERWATER OPERATION

Charles Wilde, Ridgewood, N. J., assignor to Bendix Aviation Corporation, Teterboro, N. J., a corporation of Delaware Application March 23, 1948, Serial No. 16,517

12 Claims. (Cl. 310—89)

1

The present invention relates to engine accessories, and particularly to devices provided for association and cooperation with engines which are adapted for certain underwater service, the examples herein given, by way of example, relating to engine starters and generators for vehicles mainly intended for travel on land, but which may ford streams of certain depths.

In such service, it is necessary when the accessory is submerged, to protect it completely and effectively against the admission of water, which injures it irrespective of whether the accessory is of the mechanical, fluid operated or electrical type, and may render it incapable of subsequent operation prior to repair or expensive time-consuming overhaul.

An accessory, such as an electrical starter in particular, has several places which are highly vulnerable to the admission of water, such as the commutator brush inspection windows, the pole shoe holding screws which are exposed at the outer side of the motor, and the joints between the motor or generator housing portions and other parts.

Attempts heretofore made to render such accessories proof against the admission of moisture, under the severe submerged conditions mentioned, have, by reason of space, weight and other factors, disregarded any principle except that of the separate individual sealing of each point of water entry or seepage, this being the natural and most self suggestive method under the limitations imposed by space, weight, cost and other considerations.

However, all known attempts of such character have met with failure, probably because of the lack of coordination of any kind of the several seals with each other, the individual sealing of the dynamo brush-inspection openings of an electrically-operated automatic engine starter being a particularly difficult proposition for repeated breaking and remaking of the individual seal.

It is an important consideration, in the service for which the present invention is intended, that the seals of all of the many individual seal points must be capable of repeated breaking and remaking in a minimum of time, with a minimum of consideration given to the points either individually or collectively.

It is important also that the results must be obtained without at all interfering with the normal effective working of the accessories, and with a minimum of change of size, form, weight and cost.

Among the objects of the present invention

2 are to overcome all of the objections to, and disadvantages of, former sealing means, as above indicated, and to do so by novel effective means.

Another object is to provide means of the character desired which shall be of substantially minimum size, cost, weight and number of parts, and which will facilitate assembly and disassembly.

Another object is to provide a device which is subject to repeated rapid disassembly and assembly of a certain limited kind in the field, without altering the character and effectiveness of its sealing quality, and without the requirement of special skill.

Another object is to provide a seal for certain accessories, which seal shall embody a major homogeneously or molecularly integral unit of water impervious material adapted to effect several seals at once.

Another object is to provide such unit and an accessory, for which it is adapted, with cooperating pilot means whereby the unit may have a substantially automatic adjustment without special effort by an operator while he is mounting the unit on the accessory.

Another object is to provide a unit as aforesaid with a plurality of molecularly integral water-impervious portions any one of which may be selectively pierced, or drilled and machined, for the water-proof reception of an appurtenant part, such as a liquid-proof conductor conduit, while another retains its original impervious character.

Another object is to provide novel effective means for sealing an accessory as aforesaid and, at the same time providing for its complete internal forced draft cooling during submersion.

Another object is to provide a unit seal, enveloping an engine accessory and individual leakage points of the accessory, in which individual points, between sationary and relatively movable parts, for possible leakage in the seal unit itself are considerably reduced in number and more effectively sealed.

The above and other objects and features of the invention will appear more fully hereinafter from a consideration of the following description taken in connection with the accompanying drawings wherein several embodiments of the invention are illustrated by way of example.

In the drawings:

Figure 1 is a side view, partially in elevation and partially in section, of an engine accessory in the form of an engine starter embodying the invention in one form;

Figure 2 is an end view, partially in section and partially in elevation, of the structure of Figure 1, taken from the right;

Figure 3 is a view similar to a portion of Figure 1, illustrating the invention modified or adapted to a starter of different form from that of Figure 1;

Figure 4 is a view similar to Figure 3 of another modified form;

Figure 5 is a view similar to Figure 1 of an engine accessory in the form of a generator embodying another modification of the invention;

Figure 6:
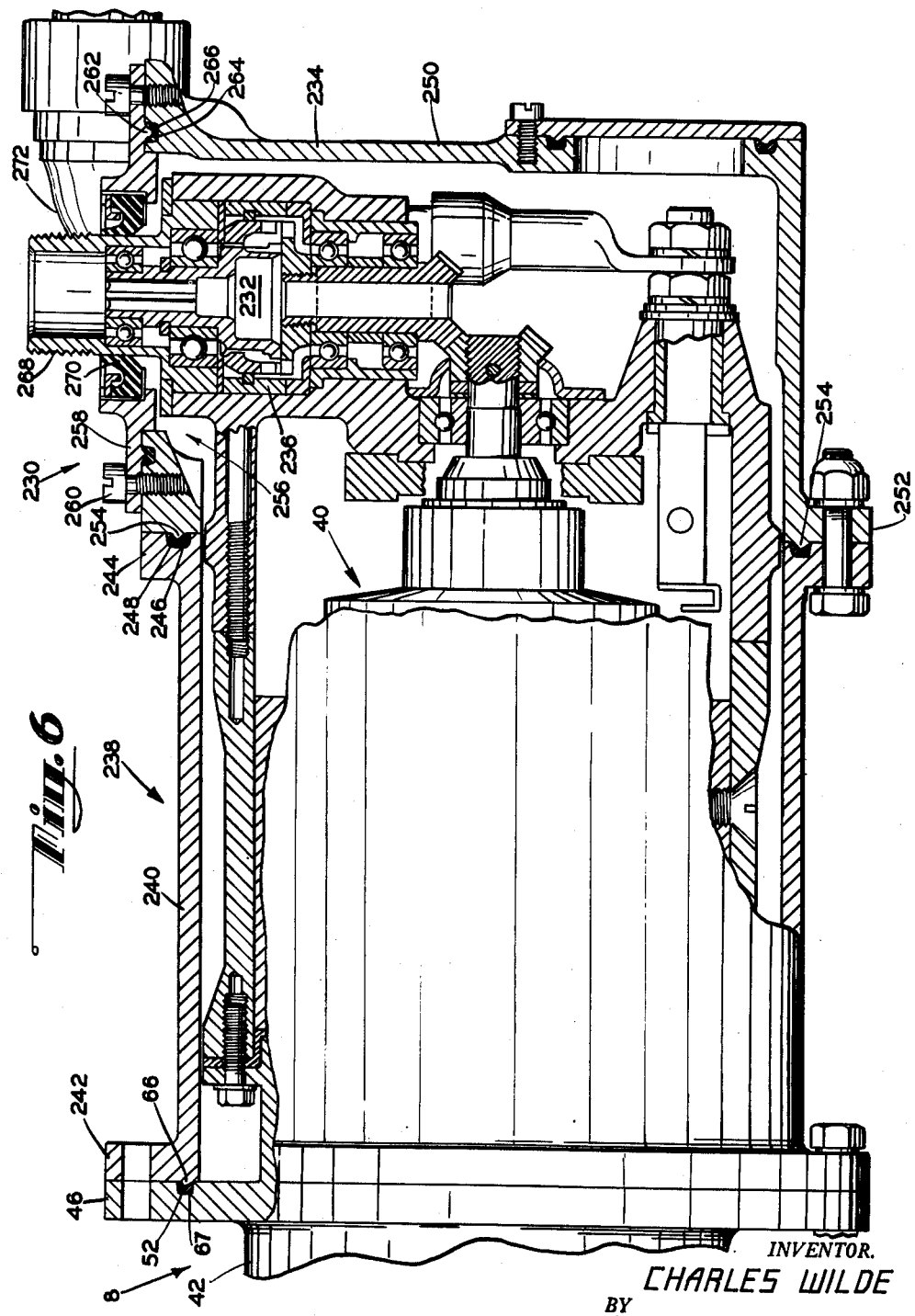
Figure 6 is a fragmentary section of a starter including hand or independent cranking means and constituting another form of the invention.

Referring to Figures 1 and 2, the accessory of the device therein comprises a housing 8 including an inner cup or engine-end baffle 10 having a radially outer perimetral mouth-end ring flange or rim 12 for position against a gasket 9 about an opening 14 in an engine case 16 and mounting, as by a circle of studs 18, which extend from the case 16 through the rim 12 therein.

The baffle 10 includes an apertured-bottom cup-like portion or body 20 protruding outwardly from the radially inner edge of the rim 12 into the case 16 through the opening 14. An engine cooperating clutch member or jaw 22 is axially and rotatably movable in the bottom aperture of the cup 20.

An outer-end motor frame or portion 24 of the housing 8 includes an outer-end bell 26 having a bearing 28 removably secured to an inner flux field circuit or motor yoke 30, as by screws 32. The housing portion 24 also includes an inner-end partition 34 having a bearing 36 which, with the bearing 28 act as journal means for a shaft 38 of a dynamo or motor 40.

For cooperation with the above-numbered elements, the invention comprises an accessory-mounting head or housing portion 42, between the baffle 10 and the partition 34, including axially-spaced radially-outer flanges 44 and 46, the axially inner flange 44 of which has a circle of holes for the studs 18, and the axially outer flange 46 of which has a circle of openings for bolts 48. The flange 44 has an axially inner-side annular groove 50 radially inwardly of the studs 18, and the flange 46 has an axially outer-side annular channel 52 radially inwardly of the bolts 48.

An annular seal gasket 54, in the groove 50, is compressed by the studs 18 between the baffle rim 12 and the flange 44 of the head 42, the latter having a lateral wall 56 axially outwardly opposite the flange 46. Stud means 58 extend through the wall 56, a portion of an annulus gear 57 and the partition 34 into the motor yoke portion 30 for connecting the wall 56, the partition 34 and the yoke 30 to each other.

Seal means 60 includes a homogeneously or molecularly integral unit 62 of water-impervious light weight material, such as aluminum, including a rim 64 secured by the bolts 48 to the axially outer flange 46, with an annular tongue or bead 66 compressing the gasket 55 in the channel 52. A cup body portion 68 of the unit 62 envelopes substantially all of the remainder of the starter from the flange 46 to the right, as shown, or axially outwardly of the rim 64, the unit 62 having as its only exceptions as a completely homogeneous or molecularly integral seal, a closed cup end aperture 70 surrounded by a channel 72 in its outer surface 74 and thickened outer-end and side portions 76 and 78, respectively. The portions 76 and 78 are adapted for the selective opening of one thereof for the fluid-tight sealed reception of a fluid-proof conduit coupling 80 for a motor lead or leads 82. This structure includes a compressed gasket 83 effecting a liquid tight joint for the coupling. A plate 84, secured to the unit 62, as by screws 86, has a tongue 88 for compressing a gasket 90 in the channel 72.

In each instance, as where a body, such as the body 68 has a groove or channel, such as the channel 72, and the cooperating body, such as the plate 84, has a tongue or bead, such as the bead 88, it is to be understood that the channel may be in either body, and the bead on the other.

The accessory or starter and the unit 62, in this instance, are both of circular cross-sectional contour, with the unit 62 having only sufficient clearance (A) relative to the starter, throughout the greater length of the unit 62 and the starter, to facilitate the assembly of the unit over the starter. Near is flange 46, the head 42 is provided with a ramp or pilot portion 102, by which, when the unit is close to its final assembled position, the above-mentioned clearance is reduced to the left of the pilot 102 as shown, and the bolt holes in the rim 64 are more accurately radially centered relative to the bolt holes in the flange 46 for the rapid reception of the bolts.

Figure 2 better shows annularly-spaced inspection-assembly apertures or windows 96 in the end bell or bearing portion 26, and known as brush openings for brushes 98, illustrated only in Figure 2, and indicates the greater simplicity and effectiveness of the cup body portion 68 of the unit 62 as a liquid tight seal for such windows than a split band or collar especially for the windows and not including other leakage points, such as at the screws 32 for holding pole members to the field core portion 30, and at the positions of joinder of the motor frame parts 26, 30 and 34.

In applications wherein accessories, similar to those hereof, are not subject to submersion, it is possible for oil and water to sometimes tend to enter an accessory from the engine, which is guarded against, as by a ring-seal device 106.

The present invention does not relate to means for preventing the entry of water to the accessory, as by passing the seal 106, but to means, as set forth, for preventing the direct entry of water of submersion to parts of the accessory from outside or to the right of the engine case 16, as shown.

Figure 3, in which corresponding parts are designated by corresponding reference characters, relates to a starter accessory which, in general, is similar to the device of Figures 1 and 2, but differs principally in variations of the parts shown.

Differences of note reside in the greater distance between the flanges 44 and 46, the modified lateral wall 56, which is not so extensive axially, and the partition 34 which, in this instance, is of lighter-weight, more shallow dish form. The ramp or pilot means 102 has greater axial extent and more gradual slope.

In Figure 4, the flange 46, instead of being to the left of the lateral wall 56, as in Figures 2 and 3, is to the right of the wall 56, thus shortening the unit 62. Studs 59, corresponding to the studs 58, in this instance, are sealed by ring gaskets 61 compressed in position against an unthreaded portion of the studs, as by washers 63 held as by stop nuts 65. The form of Fig. 4 has the advantages of lighter weight and better accessibility.

In Figure 5, an engine accessory device or generator 110, for operation on a vehicle and adapted for submersion therewith in a body of water, comprises the combination of an inner-end accessory-mounting head 112 for position about an opening 114 in, and mounting on, an engine case 116. The head 112 comprises a welded-on mounting ring portion 118 held against a sealing gasket 120, as by stud-and-nut means 122 in pockets 124 having outer openings 126 and formed in the body 112.

A generator member or quill shaft 128 cooperates with the engine through the opening 114 and has a portion 130 splined within a cavity of an engine shaft 132. The head 112 supports a bearing 134 and a ring seal 136 between a hollow shaft 138 and an annular portion 140 of the head 112. A spring 142 acts between a ring 144 on the head 112 and a friction disc 146 having a spline connection 148 to the shaft 138 and having a friction plate 150 for engagement with a ring 152 splined to the quill shaft 128.

The head 112 constitutes the inner end member of a generator frame of separably connected sections including a generator yoke 154 and an outer-end generator housing portion 156 having brush openings 158, a bearing 162, a generator armature 160 having its shaft 138 journaled in the bearings 134 and 162. The head 112 has an annular channel 164 for the reception of a gasket 166.

A seal or housing unit 170, correspondingly generally to the seal unit 62 of Figs. 1, 2 and 3; comprises a ring 172 clamped, as by screws 174, to the head 112 including a bead 176 compressing the gasket 166 in the head channel 164 and having an outer-end ring channel 178, and an air outlet port 180 adapted for cooperation with conduit means 182 exhausting air from the port 180 above the water body surface 184.

A main or intermediate housing body 186 around the generator 110, clamped to the ring 172, as by nut and bolt means 188, comprises an inner-end bead 190 compressing a second gasket 192 in the ring channel 178.

The unit body 186 has a compartment 194 for a generator terminal block 196, and is provided with an outer end annular groove 198. One or more fluid-proof generator-lead conduit couplings 200 extend through and are sealed to, a thickened wall portion 202 of the compartment 194.

An outer-end unit member 204, surrounding fans 206 on the generator shaft 138, is clamped, as by nut and bolt means 208, to the unit body 186 and is provided with a bead 210 compressing a gasket 212 in the groove 198. The member 204 has a nozzle-like portion 214 adapted, as by the provision of a bead 216 and clamping ring means 218, for attachment to a hose 220 or other conduit means 221 for receiving air from above the water surface 184.

In the form of Figure 5, the housing body 186 of the device 110 is provided with peripherally spaced outer-surface pilot-means or risers 222 having leading sides or ramps 224 to the right, as shown, corresponding to the ramps 102. The enclosure 186 cooperates with the pilot means 222 for assembly of the enclosure on the generator housing portion 156 and providing air-flow spaces 226 between the enclosure 186 and the housing 156. Arrows indicate the flow of air through the enclosure 186 and into, and out of the housing 156 caused by air from the conduit means 221 and exhausting through the conduit means 182.

Figure 7:
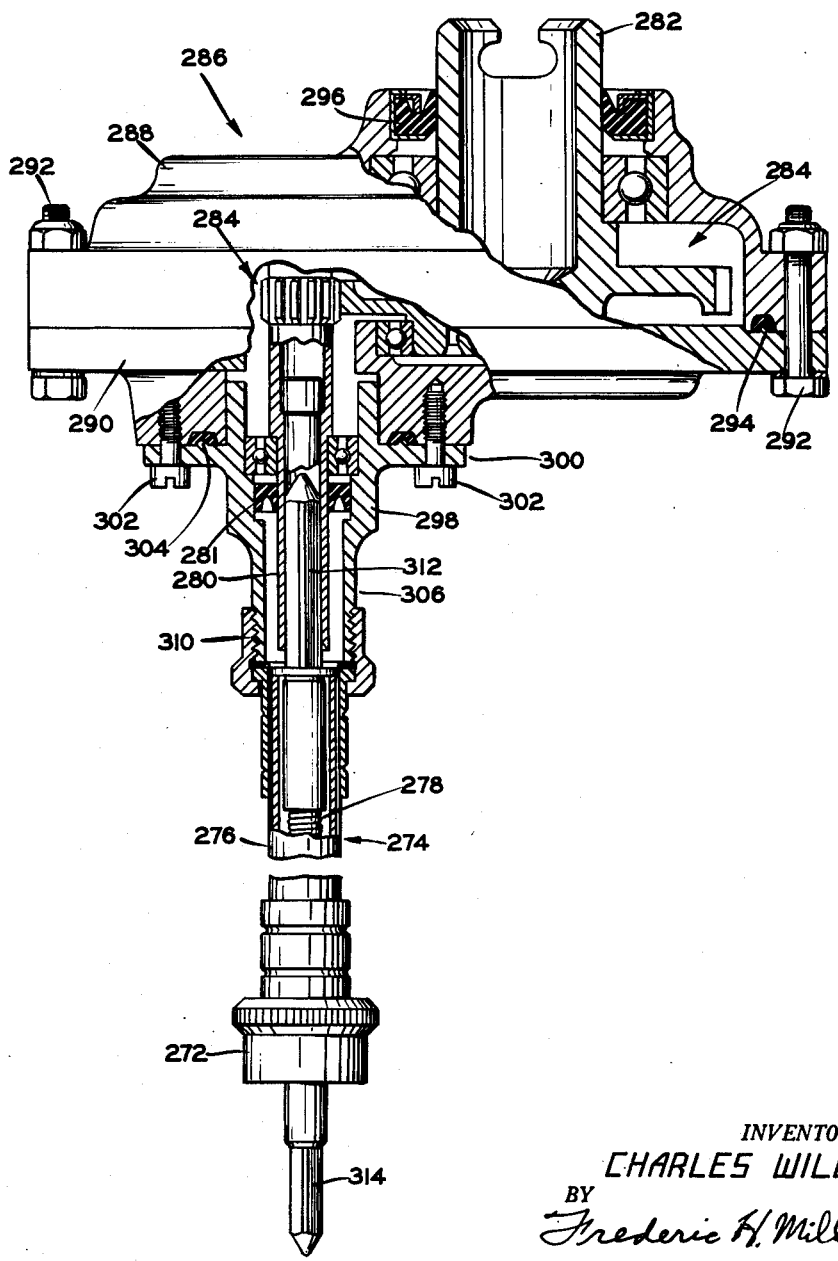
Figure 7 shows the invention in the further modified form of a remote operating attachment for the structure of Figure 6.

In Figure 6, the accessory, which is to be understood both as a separate entity and as part of the structure of Figure 7, the accessory comprises the combination of a housing 8 including a head 42 for position exteriorly of an engine case about an opening in, and mounting on an engine case, similar to the construction of the head 42 about the opening 14 in the engine case 16 of Figure 1. The head 42 includes an outer flange 46 and an annular channel 52, a gasket 67 in the channel, a member (not shown) corresponding to the jaw 22 for cooperation with the engine through an opening corresponding to the above-mentioned opening 14.

Means 230 for rotating the member 22 comprises a rotatable element 232 having its axis laterally of the accessory adjacent to the outer end 234 of the latter, and including clutch means 236 responsive to operation of the element 232 for connecting the latter to the member 22, as set forth in connection with Figure 5 of copending application of Romeo M. Nardone, Serial No. 525,417, filed March 7, 1944, now U. S. Patent No. 2,446,297.

A seal unit 238 comprises a cylinder 240 open at each end, having flanges 242 and 244 at its ends, and includes an inner end tongue or bead 66 for pressing the gasket 67 in the channel 52. The cylinder 240 has an outer-end groove 246, and a gasket 248 in the groove 246.

The unit 238 also includes an outer-end cup-like member 250 having an inner mouth-end flange 252 complemental to the outer-end cylinder flange 244 and a tongue or bead 254 for compressing the second gasket 248 in the groove 246 and having an aperture 256 into which the element 232 extends.

A plate 258, clamped to the cup 250, as by screws 260, around the element 232, has a tongue 262 opposite a groove 264 in the cup 250, in which groove, a gasket 266 is compressed by the plate tongue 262. A screw threaded tubular portion 268 is disposed around the element 232 extending through the aperture 256, and a seal ring 270 provided around the tubular portion 268 between the latter and the plate 258.

Terminal means 272 corresponding to the coupling 80 of Figure 1, is provided for the motor 40.

In Figure 7, an engine accessory comprises, in combination, a driven output member 280, an input driver 282, a train of gears 284 between the output member 280 and the driver 282 and a water-proof cover or casing 286.

The cover 286 comprises outer and inner main body portions 288 and 290, respectively, clamped together, as by bolt and nut devices 292, having a gasket-compressing tongue and groove seal 294, as above-described, therebetween, a seal 296 around the driver 282, between the driver and the body portion 288, and a tubular element 298 having a cover plate portion 300 clamped, as by screws 302, to the body 290. The element 298 has a gasket-compressing tongue and groove seal connection 304 to the body 290 and includes a screw threaded tubular portion 306 enclosing a seal 281 around the output member 280.

Terminal means 310, similar to the terminal means 272 of Figure 6, and connected to the latter by a flexible structure 274, is threaded to the tubular portion 306 in water-tight relation thereto. The structure 274, in this instance, comprises a non-rotative outer sheath 276, as of hose construction, and a flexible inner rotatable core or shaft 278 constructed as of wound piano wire. Prongs 312 and 314, at the ends of the shaft 278, removably fit the members 280 and 232 of Figures 7 and 6, respectively.

Although several embodiments of the invention have been illustrated and described, various changes in the form and relative arrangements of the parts may be made to suit requirements.

What is claimed is:

1. The combination with an engine accessory comprising a housing including a cup-like baffle having a mouth rim for position about an opening in and mounting on an engine case by studs through the rim with the cup body in the case; an engine-cooperating member extending through the cup bottom; an outer motor frame comprising separably connected portions including an inner portion and an outer-end bearing portion having brush openings, motor pole screws exposed at the outer motor side, and an inner-end bearing partition; and a motor shaft journaled in the bearings; of an accessory-mounting head or housing including an inner flange for mounting on the engine by the studs and having an inner-side annular groove, and an outer flange having bolt openings and an outer-side annular channel; a gasket compressed in the groove by the studs and the baffle; the head having outer-surface pilot means and a lateral wall outwardly opposite the outer flange; means extending through the wall and the partition into the inner end frame portion connecting the same; and seal means including a cup unit including a mouth end rim connected by bolts to the outer flange with a bead in the channel and a cup body enveloping all of the accessory outwardly of the unit rim; the unit cooperating with the pilot means for positioning relative to the bolts and having thickened end and side blocks for selective opening of one thereof for the fluid-sealed reception of a fluid-proof motor-lead conduit, the unit having a closed-end conduit-access aperture surrounded by an outer-side channel; a plate secured to the unit covering the aperture having a bead in the associated channel; and a gasket compressed in each of the channels by the associated bead.

2. The combination with a device including a housing and adapted for position generally exteriorly of an engine case but having means operative through a wall of the housing adapted to operate through an opening in an engine case for cooperation with an engine associated with a vehicle adapted for submersion, said device having means adapted for cooperation between said first means and means exteriorly of the device away from the engine and including an element movable relative to the housing extending to the exterior of the housing, of means for preventing the direct entry of water of submersion to the housing from outside the engine comprising water-impervious enclosure means for the device enclosing the housing and having an aperture around said element, a tubular portion around said element a seal between the housing and said tubular portion and sealing the housing at said aperture, a water-proof encased flexible shaft exteriorly of the housing adapted for water-proof connection at one end to said element, and a structure having water-proof connection to the other end of the flexible shaft for operating said element to operate said first means comprising a driven output member at said connection, an input driver, a train of gears between the input member and the driver, a water-proof cover for said train comprising main body portions clamped together having a tongue and groove gasket-compressing seal therebetween, a seal around the driver between the latter and one of said body portions, and a cover element clamped to the other body portion having tongue and groove gasket compressing seal relation thereto and enclosing a seal around the output member.

3. The combination with an engine accessory comprising an inner end baffle; an engine-cooperating member extending through the baffle; an outer motor including inner and outer end bearing and intermediate field sections separably secured to each other, and pole screws exposed at the outer side of the motor; of an accessory-mounting head or housing between the baffle and the inner bearing section including inner and outer end and intermediate mounting portions, the inner-end and the intermediate mounting portions having inner and outer side annular channels, respectively, means between the outer-end mounting portion and the motor for securing the inner-end and intermediate motor sections to the housing and to each other, a gasket in the inner side channel and means for securing the inner-end mounting portion and the baffle to the engine and compressing the gasket; and seal means including a unit including a bead in the outer channel and a cup body enveloping all of the remainder of the accessory outwardly of the bead surrounding the mouth end of the cup, a gasket in the outer channel, means for securing the seal means to the housing and causing the bead to compress the second gasket, the unit having a closed-end conduit-access aperture surrounded by a groove and a duct for the fluid-tight sealed reception of a fluid-proof motor-lead conduit, a plate secured to the closed end covering the aperture having a bead in the groove, and gasket compressed in the groove by the plate bead.

4. In an engine accessory for operation on a vehicle and adapted for submersion therewith in a body of water, the combination of a housing having a head for position about an opening in and mounting on an engine case and including an outer flange and an annular channel, a gasket in the channel, a member cooperating with the engine through said opening, means for rotating said member comprising a rotatable element having its axis laterally of the accessory adjacent to the outer end thereof and including clutch means responsive to operation of the element for connecting the latter to said member; a seal unit comprising a cylinder open at each end having flanges at its ends and including an inner-end bead for pressing the gasket in said channel and having an outer-end groove, a gasket in the groove, an outer-end cup-like member having an inner mouth-end flange complemental to said outer-end cylinder flange and a tongue or bead for compressing said second gasket in said groove and having an aperture into which said element extends, a plate clamped to the cup around the element having a tongue opposite a groove in the cup, a gasket compressed by the plate tongue in the latter groove, a tubular portion of the housing around the element extending through said aperture, and a seal around said tubular portion between the latter and the plate.

5. In an engine accessory for operation on a vehicle and adapted for submersion therewith in a body of water, the combination of an inner-end accessory-mounting head for position about an opening in and mounting on an engine case and having a bearing; a member cooperating with the engine through said opening, an outer generator frame comprising separably connected portions including an outer-end bearing portion having brush openings, a generator armature having a shaft journaled in said bearings, said head having an annular channel, a gasket in the channel; a seal unit comprising a ring clamped to the head including a bead compressing said gasket in the head channel and having an outer-end ring channel and an air-outlet port adapted for cooperation with means exhausting air from the port above the water-body surface, a gasket in the ring channel, a body of the unit around the generator clamped to the ring including an inner-end bead compressing said second gasket in the ring channel, the unit body having a terminal block compartment and an outer-end annular groove, a fluid-proof generator-lead conduit extending through and sealed to a wall of the compartment, and an outer-end unit member clamped to the unit body having a bead compressing a gasket in the groove and adapted for cooperation with means for receiving air from above said surface.

6. The combination with an engine accessory comprising an engine-end baffle; and an outer motor including separably connected end and intermediate sections; of means for preventing the admission of water to the accessory when the latter is completely submerged comprising a cup-like seal unit of fluid-impervious material, a head intermediate the baffle and the motor including an engine-mounting portion having an annular channel, a motor-mounting portion and a unit mounting portion having an annular channel, gasket means in said channels, means attaching the motor to said motor-mounting portion, means for attaching said engine-mounting portion and the baffle to the engine and compressing the first gasket, means attaching the unit mounting portion to the unit and compressing the second gasket, the unit having, as its only exceptions as a complete molecularly integral seal, means fluid-tightly receiving a fluid-proof motor-lead conduit and a lead-access aperture, a plate removably closing the aperture, gasket means surrounding the aperture, and means attaching the plate to the unit and compressing the aperture gasket between the unit and the plate.

7. In combination, a device having peripherally spaced outer-surface pilot means and adapted for position generally exteriorly of but having means adapted to operate through an engine case for cooperation with an engine associated with a vehicle adapted for submersion in a body of water, said device including a housing on which said pilot means are disposed and elements in the housing adapting the housing to receive air for circulation over the elements and discharge from the housing, of means for preventing the direct entry of water of submersion to said housing and elements from outside the engine including a water-impervious enclosure enclosing said housing, said enclosure cooperating with said pilot means for assembly on the housing and providing air-flow spaces defined by the pilot means between the enclosure and the housing, and means providing for the circulation of air through said enclosure and said spaces and into and out of the housing and including inlet and outlet means adapted for cooperation with conduit means between the device and positions above the level of the water body.

8. The combination with an engine accessory comprising an engine-end baffle, and an outer motor including separably-connected sections and brush openings, of means for preventing the admission of water to the accessory when the latter is completely submerged comprising a head intermediate the baffle and the motor including an engine mount, a motor mount, and a unit mount; a cup-like seal unit for mounting on the unit mount for completely enclosing the accessory from the head outwardly to position enclosing the outer end of the motor; means attaching the motor to the motor mount, gasket means between the baffle and the engine mount and between the unit and the unit mount; and means for attaching the engine mount to the engine and to the baffle and attaching the unit to the unit mount and compressing the gasket means, the unit including means water-tightly receiving water-proof motor-lead conduit means and water-seal conduit access means.

9. The combination with a device including a housing and adapted for position generally exteriorly of an engine case but having means operative through a wall of the housing adapted to operate through an opening in an engine case for cooperation with an engine associated with a vehicle adapted for submersion, said device also having means adapted for cooperation between said first means and means exteriorly of the device away from the engine and including an element movable relative to the housing extending to the exterior of the housing, of means for preventing the direct entry of water of submersion to the housing from outside the engine comprising water-impervious enclosure means for the device enclosing the housing and having an aperture around said element, a tubular member around the element in the aperture, and a seal between the housing and said tubular member and sealing the housing at said aperture.

10. The combination with a device adapted for position generally exteriorly of but having means adapted to operate through an engine case for cooperation with an engine associated with a vehicle adapted for submersion in a body of water, of means for preventing the direct entry of water of submersion to parts of the device from outside the engine including water-impervious enclosure means for the device enclosing said parts, and means providing for the circulation of air through the enclosure means and including inlet and outlet means adapted for cooperation with conduit means between the device and positions above the level of the water body.

11. In combination in an engine accessory, a driven output member, an input driver member, a train of gears between the output member and the driver member, and a water-proof cover for the train comprising main body portions clamped together having a gasket-compressing seal therebetween, a cover element around the driver member including a seal between the cover element and one of said body portions, and a second cover element clamped to the other body portion having gasket-compressing seal connection thereto and one of said cover elements enclosing a seal around one of said members.

12. A housing for use with an engine accessory mountable on an engine for preventing the admission of water to the accessory when the latter is submerged, comprising a head including engine mounting means, means for mounting said accessory on said head, a cup-like water-impervious enclosure means enveloping said accessory, gasket means positioned between said head and said enclosure means, and means for attaching said enclosure means to said head and compressing said gasket means.

CHARLES WILDE.

REFERENCES CITED

The following references are of record in the file of this patent:

UNITED STATES PATENTS

| Number | Name | Date |
|---|---|---|
| 1,342,478 | Watt | June 8, 1920 |
| 1,355,755 | Drysdale et al. | Oct. 12, 1929 |
| 1,843,987 | Ragan | Feb. 9, 1932 |
| 2,038,182 | Linder | Apr. 21, 1936 |
| 2,189,912 | Long | Feb. 13, 1940 |
| 2,318,786 | Korte et al. | May 11, 1943 |
| 2,323,135 | Heintz et al. | June 29, 1943 |
| 2,390,557 | Scaife | Dec. 11, 1945 |
| 2,452,112 | Eckert | Oct. 26, 1948 |